Figure 1:
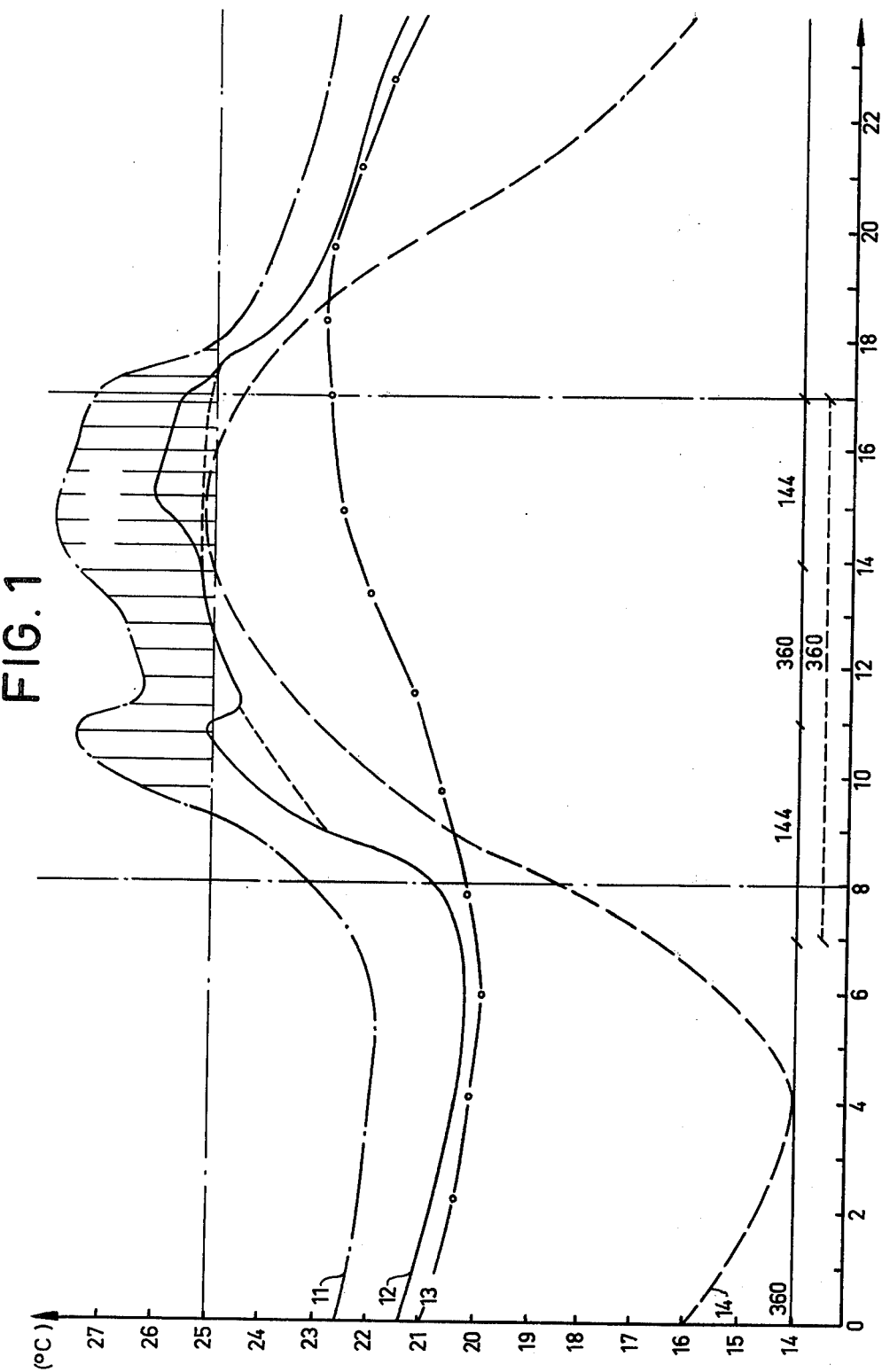

United States Patent [19]

Andersson et al.

[11] 4,124,062
[45] Nov. 7, 1978

[54] METHOD AND DEVICE FOR CONTROLLING THE TEMPERATURE IN A PREMISE

[76] Inventors: Lars O. Andersson, 12 Ropuddsvägen, Saltsjöbaden; Engelbrekt Isfält, 16 Kindstugatan, Stockholm; Axel Rosell, 4 Uppfartsvägen, Saltsjö-Boo, all of Sweden

[21] Appl. No.: 697,090

[22] Filed: Jun. 17, 1976

Related U.S. Application Data

[63] Continuation of Ser. No. 298,217, Oct. 17, 1972, abandoned.

[30] Foreign Application Priority Data

Apr. 21, 1971 [SE] Sweden .............................. 5097/71
Oct. 19, 1971 [SE] Sweden ............................. 13213/71

[51] Int. Cl.$^2$ ............................................. F25B 13/00
[52] U.S. Cl. ...................................... 165/2; 165/53; 165/DIG. 4; 138/38; 237/1 A; 62/259
[58] Field of Search ................... 165/49, 53, 18, 48, 165/56, 45, DIG. 4, 2; 126/270, 400; 237/1 A; 98/31; 138/38; 62/259

[56] References Cited

U.S. PATENT DOCUMENTS

| | | | |
|---|---|---|---|
| 1,830,099 | 11/1931 | Dollinger | 165/49 |
| 2,484,127 | 10/1949 | Stelzer | 165/49 |
| 2,559,870 | 7/1951 | Gay | 165/18 |
| 2,593,424 | 4/1952 | Edgerly | 98/31 |
| 2,621,027 | 12/1952 | Tatsch | 165/56 |

OTHER PUBLICATIONS

Air Conditioning Heating and Ventilating, vol. 52, p. 92, Oct. 1955, Raymond W. Bliss.

*Primary Examiner*—Charles J. Myhre
*Assistant Examiner*—Margaret A. LaTulip
*Attorney, Agent, or Firm*—Fred Philpitt

[57] ABSTRACT

The daily variation of the outside temperature is utilized for control of the air temperature in a premise, in such a way, that outside air is directed to the premise through channels in the building structure surrounding the premise. The channel walls are adapted to absorb or give off heat to the air flowing through the channels. This utilization is, for example, such that that cold night-time air during the night might flow through the channels and cool the mass surrounding the channels, for example a framing of joists of concrete, which cooled mass during the day-time cools warm outside air prior to its entering the premise.

5 Claims, 4 Drawing Figures

METHOD AND DEVICE FOR CONTROLLING THE TEMPERATURE IN A PREMISE

This is a continuation of application Serial No. 298,217, filed Oct. 17, 1972, now abandoned.

In connection with efforts to improve the working environment in office and business premises and also in certain industrial premises, air treatment is being introduced in an ever increasing number of cases, even in temperate climate, which treatment also comprises cooling of the supplied air with the help of cooling machines. In larger business and office buildings at us, for example, only in relatively rare exceptional cases artificial cooling is not included in the installations.

The costs for this type of cooling are substantial. The installation costs are affected not only by the cooling machines proper, but also by devices for condenser cooling, i.e. cooling towers or corresponding devices, conduit systems for coolant and usually also cooling agent, and batteries for cooling the supply air. The plant costs increase also with respect to the channel system for air distribution, as the channels through which the air flows after the cooling batteries have to be insulated.

For a normal office building, for example, the total cost for completing the air treatment with cooling is between Sw Crs. 5 and 10 per cubic meter building volume, i.e. between 2% and 3% of the total building costs.

The operation costs are likewise affected by the cooling function. The largest items of expenditure in this connection are the consumption of current for compressors and pumps and also service and maintenance costs for the cooling machinery. A considerable practical difficulty resides further in the fact that experienced service personnel are in very short supply.

In Sweden and countries with similar climate the type of cooling referred to above is only required for a relatively short period of the year. The requirement is further restricted to the time in which the temperature of the outside air exceeds the temperature of the supply air which is necessary to keep the room temperature within desired limits, and the circumstance which renders any requirement necessary at all resides in the fact that the working time conincides with that part of the day at which the temperature of the outside air is at its maximum. For a very large part of a day, even during extremely hot periods, it lies at or below the desired supply air temperature.

According to the present invention therefore, there is a method for exploiting the daily variations in outside temperature for controlling the temperature of air, for example in a premise, characterized in that outside air continuously or discontinuously is caused to flow through channels in a heat-storing mass and thereby is caused by absorbing or giving off heat to change its temperature in accordance with a demand of heating and/or cooling varying during a day.

In another aspect of the present invention there is a device for exploiting the daily variations of the outside air temperature for controlling the air temperature, for example in a premise, for carrying out the method according to claim 1, the outside air being caused to flow continuously or discontinuously through channels in a heat-storing mass and thereby being caused by absorbing or giving off heat to change its temperature in accordance with a demand of heating and/or cooling varying during a day, characterized in that the heat-storing mass is at least in part of the building structure surrounding the premise.

For example it is possible by means of the invention by utilizing the relatively low night temperature of the air to achieve the necessary cooling effect during the hot part of the day. It is further possible by utilizing a relatively high temperature of the outside air during the day to achieve the necessary warming effect during the colder part of the day. It it totally possible to construct devices for this with simple means and at relatively low cost.

What is required in principle is an accumulator with a sufficient thermal efficiency and such other properties that both the giving off and the absorbing of heat can be controlled in agreement with the variations of the cooling requirement.

The accumulator can be thought of as comprising both a solid material and also a liquid, for example water. Economically, however, it is most expedient if some part of the building construction proper can be used as an accumulator.

A calculation of the present cooling requirement and the available thermal capacity shows that in a normal building intended for some of the aforementioned purposes the use of the floors of the building as the accumulator provides a possible solution. In order to obtain the desired transfer of heat it is necessary, however, to provide between the supply air and the concrete a contact surface which is considerably larger than those found in previous constructions. This can be achieved, for example, by providing the floor with a system of channels through which flows the ventilation air supplied to the room. It is necessary in this connection to choose such a ratio between the transfer surface and the air flow area that both $\alpha$ values of the required magnitude are achieved and the thermal course, the giving off and absorbing of heat, is given a suitable periodicity in proportion to the cooling requirement of the premise.

This course is influenced also by the arrangement of the air channels in the concrete slab and also by the size of the air flow.

An arrangement of the channels at a greater distance from a surface results inter alia in a greater delay and also in a reduction in the temperature variations of the surface in relation to the variations of the outside air. This is of particular importance beyond the effect on the accumulated heat amount, because the heat transfer between the surfaces of the concrete slab and the room represents a substantial part of the heat exchange.

The greatest amount of heat in the premises where the air treatment is to be applied often is constituted by sun radiation through glass surfaces in the front of the building. Absorption of heat is therefore necessary for completely different periods of time on fronts facing in different directions. The length of the air channels, their position in the concrete slab and the air flow, thus, must be so adjusted that absorption of heat takes place in the slab at that precise period of time when there is a cooling requirement.

In office and business buildings and also residential dwellings the amount of heat by sun radiation, measured for example per longitudinal meter of the front, lies within certain pretty well defined limits. The thickness of the floors and the air flow suitable for the treatment of the air likewise lie within relatively narrow limits. This means that the maximum requirement for transporting heat between air and concrete also shows relatively small variations in different plants. The deciding factor for heat transfer at a given flow of air is A × α, where A is the circumferential surface of the channels and α is the air-concrete heat transfer number.

In order for a cooling plant of the construction here mentioned to work correctly, the highest value for the factor A × α must therefore lie within a certain definite range. If the requirement for heat transport falls, then A × α can be reduced by adjusting the air flow.

The whole process, in mathematical terms, is very complicated, and it would have been practically impossible before the introduction of the data processing technique to conduct the calculations which are necessary for a safe function. To-day, however, it is possible to construct a data processing programme which provides a safe and easily understandable basis for dimensioning.

The enclosed graphs show the variations in the room temperature in a 3-module room in an imagined office building to which outside air is supplied, the temperature of which varies in accordance with a curve which is normal for one day during a hot period in a northern European climate. The supply air was assumed to flow through floor channels which were dimensioned with respect to the desired accumulation effect. Both the thickness of the floor and also the air flow were chosen according to normally occurring values.

These graphs as well as a series of similar graphs with different prerequisites were drawn up with the help of currently available data processing programmes. They show unambiguously the possibility of controlling the temperature course in a satisfactory way.

The calculations were carried out with a data processing programme which was developed by Lecturer Brown, of the Institute for Heating and Cooling Technology at the Royal Technical High School in Stockholm, in co-operation with AB Datasystem and with funds from the National Swedish Council for Building Research. The calculation model which forms the basis of the programme is very complete. Even in international terms the programme may well be the most reliable which is currently available.

Figure 2:
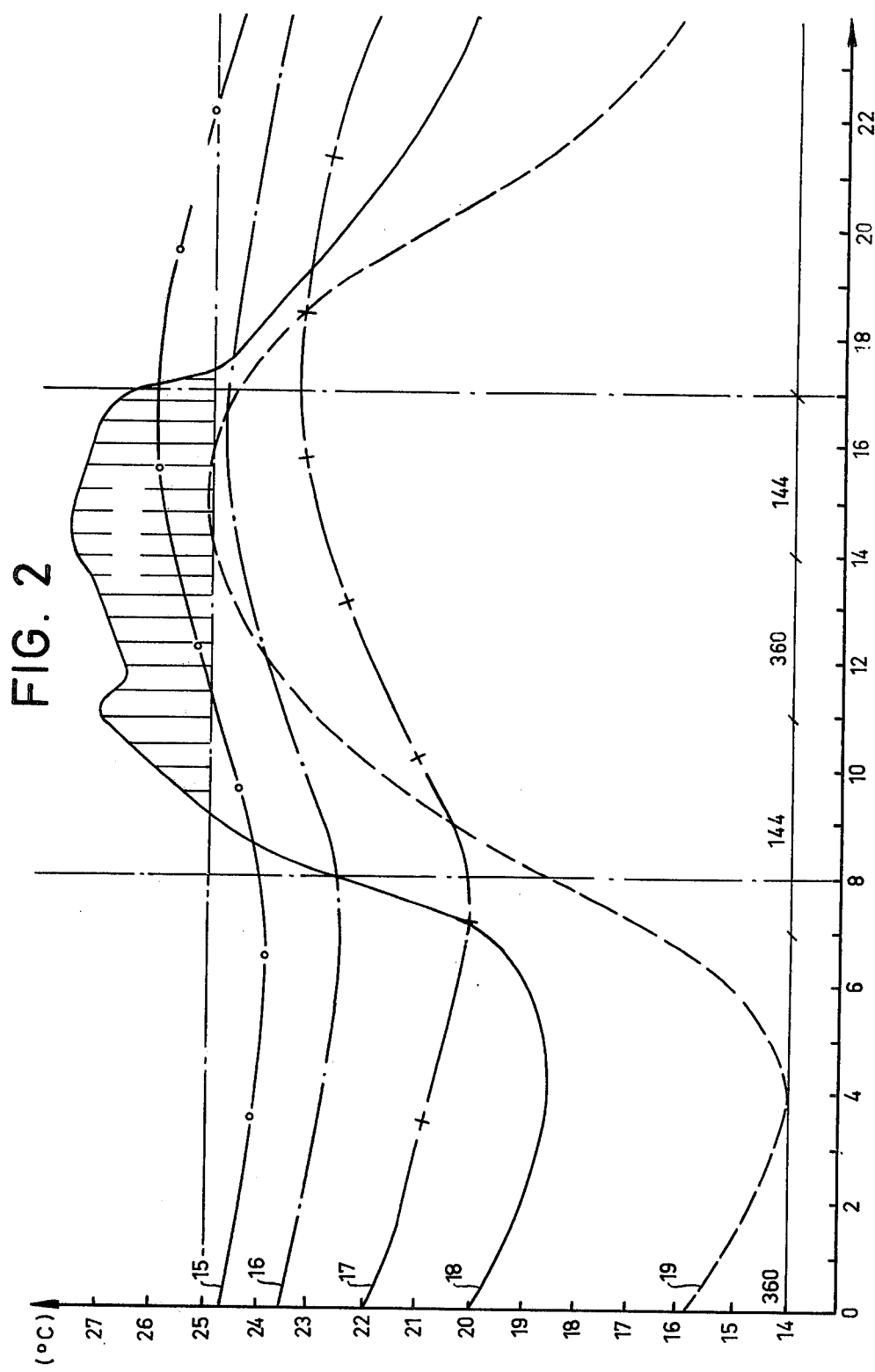
Figure 3:
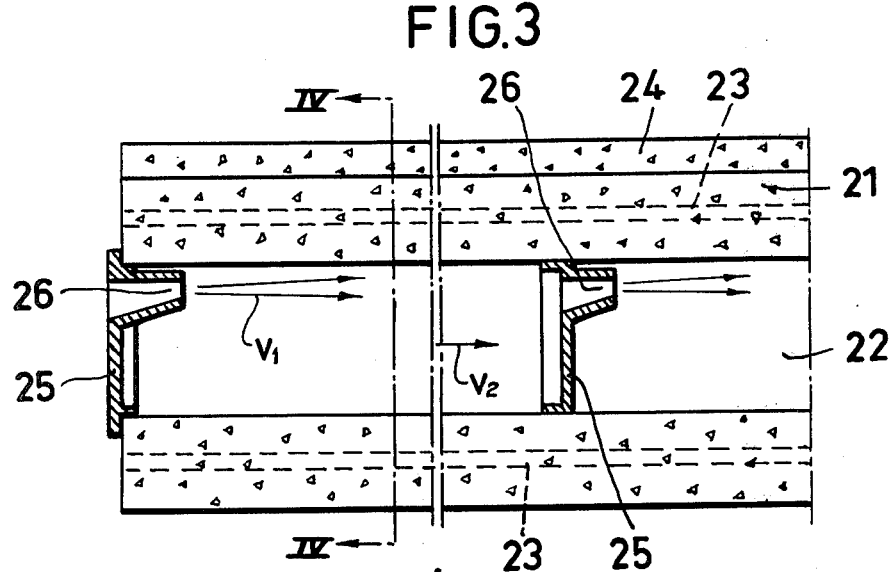
Figure 4:
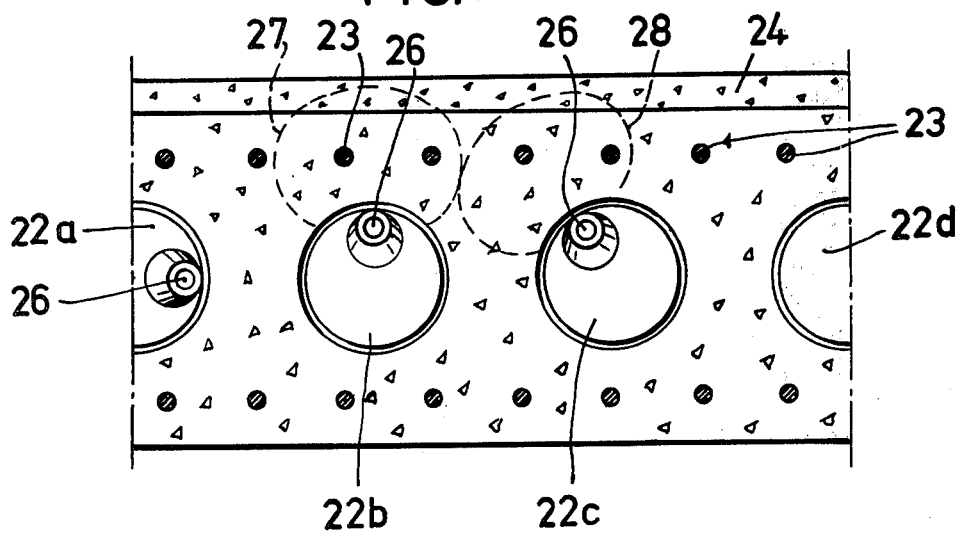

In the accompanying drawing, thus, FIGS. 1 and 2 show graphs of the temperature course in an office room with 3 modules (3 × 1,2 m), south front with circa 40% glass surface. The chosen outside conditions correspond to a period in July with clear weather and a maximum outside temperature of + 24° C. The floor has a thickness of 0,3 m, and a blind is positioned between the window panes. FIGS. 3 and 4, the latter a section IV—IV of FIG. 3, show in longitudinal/cross-section an advantageous device according to the invention for effecting the transfer of heat between channels in a floor, through which air is flowing, and the floor.

Curve 14 shows an assumed temperature course for the outside air which is blown into a floor according to the invention. The temperature of the air flowing into the floor was assumed in this case to be equal to the temperature of the outside air with an addition of 1° C. for the fan work. In this case the temperature shown for 0 o'clock is circa 16° C. The temperature thereafter falls until 04°° hours when it begins to rise again and reaches 25° C. at circa 14°° hours whereafter it falls again.

The temperature of the air blown into the room will, as a result of the heat-accumulating properties of the floor, vary according to curve 13. During the night the floor will heat the air which is flowing through and during the day it will cool it. If the floor were not constructed in accordance with the invention, i.e. without regard to the exchange of heat with the air flowing through, the temperature of the air blown into the room would have varied as the outside air, with the addition of 1° C. according to curve 14 in FIG. 1 or curve 19 in FIG. 2 (14 and 19 are the same curves).

The exchange of heat between the floor and the air flowing through was controlled by changing the air flow. Until 07°° hours the air flow into the room from the floor is 360 kg/h, and between 07°° hours and 11°° hours it it 144 kg/h, etc., in accordance with the scale above the hour axis.

Curve 12 shows how the temperature of the air in the room will vary. Until 08°° hours the temperature of the air in the room will be substantially equal to the temperature of the air which is blown in. After 08°° hours the effect of sun radiation makes itself felt with a resulting increase in temperature. At 11°° hours the air flow increases to 360 kg/h, the temperature of the air in the room falling as a result of the removal of heat from the floor which is thereby effected. The dot-dash section of curve 12 corresponds to the case where the air flow is constantly equal to 360 kg/h during the whole day (and the night as well).

A substantial part of the cooling of the room during the day takes place by transmission of heat between the floor and the room. Curve 11 shows the temperature of the air in the room if the temperature of the air flown in is assumed to vary in accordance with curve 13, and the floor is conventional, i.e. not adapted for heat accumulation. As the floor cannot be cooled in this case, its surface temperature will be higher in the morning, and as a result its cooling effect by radiation will be worse.

This latter behaviour is shown by curves 15 and 17 in FIG. 2, where curve 15 shows the temperature of the surface of the ceiling at air temperatures according to curves 11 and 13 and curve 17 shows the temperature of the ceiling at a floor according to the invention at air temperatures in accordance with curves 12 and 13. With the floor according to the invention, according to curve 17 the temperature of the ceiling surface will be circa 20° C. at 08°° hours as a result of the cooling during the night. The corresponding temperature for the ceiling of the floor which is not adapted to be cooled is circa 24° C. in accordance with curve 15. The difference in the temperature of the air in the room between curves 11 and 12 is thus caused by the difference in the ceiling temperature according to curves 15 and 17.

The curves 16, 18 and 19 refer to a conventional air treatment system in which the external air is introduced direct into the room without the exchange of heat with an accumulator and the temperature of the air blown into the room in accordance with curve 19 is assumed to be 1° higher than the temperature of the outside air. The temperature of the room air will in this case vary in accordance with curve 18 and the temperature of the surface of the ceiling in accordance with curve 16. Here also the temperature of the surface of the ceiling is higher than the ceiling surface adapted to be cooled according to curve 17.

Apart from the measures described here for exploiting the floors as a heat accumulator the general arrangement of the air conditioning plant can be in agreement with normal practice in most respects.

The channels in the floors can be placed, for example, at right angles to the front and can be connected at one end to a supply air channel which, for example, is laid in the corridor ceiling. An appropriate number of channels can be connected at the other end with a supply air apparatus.

If a final adjustment of the temperature of the supply air possibly is necessary, an air heater, for example, can be arranged in connection with the supply air apparatus.

In the device according to FIG. 3 and 4 the air is caused, during its passage through the channels 22, to form one or more jets by means of throttle member 25, the jets being directed against selected parts of the channel wall.

In order that a heat transfer of some magnitude can take place in conjunction between the jet and the wall, the jet must have such a speed that turbulence occurs between the jet and the channel wall. The device according to FIGS. 3 and 4 has the advantage that the jet and thus the transfer of heat can be concentrated on those places in the channel wall which have the greatest surrounding mass.

It is further possible by this means for the mass surrounding the channel walls to become ineffective in terms of heat storage by virtue of the fact that the air flow is reduced below the limit at which turbulence occurs between the jet and the channel wall. The cessation of turbulence leads to a drastic reduction in the transfer of heat to insignificant values, without this happening at the expense of the demand for adequate ventilation flow.

By means of the device according to FIGS. 3 and 4 it is also possible to use hollow floor arrangements which are already known without large-scale modifications.

The actual floor is designated by 21. A number of parallel channels 22 extend through the floor in its longitudinal direction and can have a circular cross-section as shown, for example, in FIG. 2. In FIG. 2 the channels are designated by 22a, 22b, 22c and 22d. The floor is further provided with suitable reinforcement 23 on which structural concrete 24 can also be poured. The inlet end of the channel 22 has a throttle member 25 with a nozzle aperture 26 as the only connection between the two sides of the throttle member 25. The throttle member 25 is, for example, a rotatable unit inserted into the channel aperture. One or more further throttle members 25 with nozzle apertures 26 can be placed deeper inside the channel 22.

The throttle member 25 with the nozzle aperture 26 is so used for the exchange of heat between air and floor 21 that an increased speed $v_1$, for example circa 10 m/s, is imparted to the air by means of the nozzle aperture 26. The air jet from the nozzle aperture is directed against a suitable portion of the channel wall. In the channel 22b in FIG. 2, for example, the jet is directed against the roof of the channel. In this case the mass is cooled and, respectively, heated on the inside in front of the dot-dash mark 27 by the air jet. In channel 22c according to FIG. 2, in order to explain the invention, the throttle member 25 has been rotated somewhat so that in this case it is substantially the mass within the marking 28 which will exchange heat with the air flowing through the floor.

In this way it is possible to concentrate the heat exchange at that point where most of the mass is situated. If, for example, by pouring on structural concrete 24 the mass above the channels becomes greater, it is possible by means of expediently directed nozzle apertures and adjustments of the air speed to concentrate the heat exchange on to this mass.

In the Figures every throttle member 25 is shown with only one nozzle aperture. It is to be understood that several nozzle apertures, for example two diametrically facing each other, can be arranged.

The transfer of heat between jets from the nozzle aperture will take place, as a result of the relatively high jet speed, with a heat transfer number which is many times greater than the heat transfer between the air further inwards in the channel where it can have, for example, a speed $v_2$ of circa 1 m/s, as the heat transfer in the first case takes place at violent turbulence. If the jet speed is lowered sufficiently the turbulence stops and this results in a drastic reduction in the transfer of heat. This property of the device according to the invention can be exploited in such a way that, if it is desired to use the floor as an accumulator, the air flow is so increased that turbulence occurs between jet and channel wall. If it is not desired that the air be influenced by and, respectively, influences the floor, the air flow is reduced below the value below what corresponds to turbulence between jet and wall. The flows required for good ventilation do not suffer from this as it is no problem to keep the air flow for initial turbulence between the limits recommended for good ventilation.

By varying the design, placement and number of the throttle member 25 it is easy to obtain the desired exchange of heat with the heat storing mass. At a relatively short channel a single throttle member in the channel may be sufficient, whereas at longer channels two or more throttle members distributed along the channel can be necessary so that the heat-storing mass surrounding the channel can be exploited to a sufficient degree.

At the floor in FIG. 3 the throttle member 25 at the inlet of the channel can also be imagined to be advanced by a short distance into the channel.

With an air conditioning plant embodied in the way here described and correctly embodied in terms of channel dimension and channel arrangement, and controlled by a correctly placed control device, it is possible in a climate of North European type to keep the condition of the air in a room within conventional comfort limits without the installation having to include cooling machinery.

As the construction of the plant in other respects shows no expensive variations from an air conditioning plant of traditional type, the savings in plant costs practically equal the total costs referred to above for cooling carried out in a traditional manner.

What we claim is:

1. A method of attaining a comfortable temperature in a room in a building with concrete floor bearing elements during such periods in the day when the outdoor temperature is higher than said comfortable temperature and during the night when the outdoor temperature is lower than said comfortable temperature, which method includes the steps of passing air from outside the building during the night through channels in the concrete floor bearing elements so as to cool the concrete, which stored coolness the following day is transferred to the room, whereby the quantity of heat and the dimensions of the concrete floor bearing elements and the number, size and location of said channels being so adapted that the stored coolness is sufficient to maintain a comformtable temperature during the entire following day, and whereby cool air during its passage through channels of comparatively warmer bearing elements can be heated before being sucked into said room.

2. A method according to claim 1 characterized in that the air on its way through the channels is caused by at least one throttle member to form at least one jet, each such jet being directed against selected portions of the channel wall.

3. A method of attaining a comfortable temperature in the office rooms of an office building during such periods in the day when the outdoor temperature is higher than said comfortable temperature and during the night when the outdoor temperature is lower than said comfortable temperature, said office rooms having concrete floors with channels running therethrough, which method includes the steps of:

(a) during the night passing air from outside the office building through said channels and out of the building so as to thereby cool the concrete surrounding said channels, (b) during the next day transferring the coolness stored in said concrete floors as a result of step (a) to the office rooms, whereby a comfortable temperature is maintained in said office rooms over a 24 hours period by alternately transferring heat by virtue of the contact between air and concrete and by virtue of the contact between concrete and air.

4. A method according to claim 3 characterized in that the air on its way through the channels is caused by at least one throttle member to form at least one jet, each such jet being directed against selected portions of the channel wall.

5. A method according to claim 3 wherein the transfer according to step (b) is effected by passing air through the channels cooled by step (a) and this air is then introduced into the office rooms of the office building.

* * * * *